(12) United States Patent
Yoshida et al.

(10) Patent No.: US 11,174,415 B2
(45) Date of Patent: Nov. 16, 2021

(54) ADHESION METHOD, ADHESION-STRUCTURE, AND ADHESION KIT

(71) Applicant: NITTO DENKO CORPORATION, Osaka (JP)

(72) Inventors: Akiko Yoshida, Osaka (JP); Kenichi Okada, Osaka (JP); Koji Akazawa, Osaka (JP)

(73) Assignee: NITTO DENKO CORPORATION, Ibaraki (JP)

(*) Notice: Subject to any disclaimer, the term of this patent is extended or adjusted under 35 U.S.C. 154(b) by 0 days.

(21) Appl. No.: 15/773,586

(22) PCT Filed: Oct. 31, 2016

(86) PCT No.: PCT/JP2016/082327
§ 371 (c)(1),
(2) Date: May 4, 2018

(87) PCT Pub. No.: WO2017/082106
PCT Pub. Date: May 18, 2017

(65) Prior Publication Data
US 2018/0327635 A1 Nov. 15, 2018

(30) Foreign Application Priority Data
Nov. 9, 2015 (JP) .............................. JP2015-219748

(51) Int. Cl.
*C09J 5/04* (2006.01)
*C09J 163/00* (2006.01)
(Continued)

(52) U.S. Cl.
CPC . *C09J 5/04* (2013.01); *C09J 7/10* (2018.01); *C09J 7/30* (2018.01); *C09J 7/403* (2018.01);
(Continued)

(58) Field of Classification Search
CPC .......................................................... C09J 5/04
See application file for complete search history.

(56) References Cited

U.S. PATENT DOCUMENTS

| 3,396,836 A | 8/1968 | Cook |
| 3,533,877 A | 10/1970 | Cook |

(Continued)

FOREIGN PATENT DOCUMENTS

| JP | S32-009886 | 11/1957 |
| JP | S48-1105 B | 1/1973 |

(Continued)

OTHER PUBLICATIONS

International Search Report dated Nov. 22, 2016, which issued during prosecution of Japanese Application No. PCT/JP2016/082327.

(Continued)

*Primary Examiner* — Daniel H Lee
(74) *Attorney, Agent, or Firm* — Hauptman Ham, LLP

(57) ABSTRACT

An adhesion method including: a step (1), disposing a stickable-curable adhesive layer on a first adherend; a step (2), disposing a curing agent layer on a second adherend, the curing agent layer being able to cure the stickable-curable adhesive layer by contacting and reacting with the stickable-curable adhesive layer; and a step (3), bringing the stickable-curable adhesive layer into contact with the curing agent layer so that they are sandwiched by the first adherend and the second adherend.

6 Claims, 3 Drawing Sheets

(51) Int. Cl.
    C09J 7/30      (2018.01)
    C09J 7/10      (2018.01)
    C09J 7/40      (2018.01)
    C09J 11/06     (2006.01)
(52) U.S. Cl.
    CPC ............ *C09J 7/405* (2018.01); *C09J 163/00* (2013.01); *C09J 11/06* (2013.01); *C09J 2463/00* (2013.01)

(56) References Cited

U.S. PATENT DOCUMENTS

| | | | |
|---|---|---|---|
| 4,906,695 A | 3/1990 | Blizzard et al. | |
| 2010/0178514 A1 | 7/2010 | Ogawa | |
| 2014/0363603 A1* | 12/2014 | KeiteTelgenbuscher | B01J 20/045 428/41.3 |
| 2015/0013875 A1 | 1/2015 | Siebert et al. | |
| 2015/0184034 A1 | 7/2015 | Taniguchi et al. | |
| 2019/0010361 A1* | 1/2019 | Hoshi | C09J 5/04 |

FOREIGN PATENT DOCUMENTS

| | | |
|---|---|---|
| JP | S51-130438 A | 11/1976 |
| JP | S58-067775 | 4/1983 |
| JP | 01-74283 A | 3/1989 |
| JP | S64-74283 A | 3/1989 |
| JP | H02-067387 | 3/1990 |
| JP | H09-104082 | 4/1997 |
| JP | H11-302602 | 11/1999 |
| JP | 2000-336333 | 12/2000 |
| JP | 2003-55632 A | 2/2003 |
| JP | 2014-65889 A | 9/2003 |
| JP | 2009-167251 | 7/2009 |
| JP | 2012-167174 | 9/2012 |

OTHER PUBLICATIONS

The extended European search report dated Apr. 30, 2019 for corresponding European Application No. 16864069.6, citing the above references.

The Notification of Reasons for Refusal dated Aug. 6, 2019 in connection with the Japanese Patent Application No. 2015-219748 with English Translation.

The Notification of Reasons for Refusal dated Jan. 14, 2020 in connection with the Japanese Patent Application No. 2015-219748 with English Translation.

Office Action issued in corresponding Taiwanese Patent Application No. 105136212 dated Apr. 30, 2020, along with an English translation.

Office Action issued for corresponding Chinese Patent Application No. 201680065318.5 dated Jun. 30, 2020, along with in English translation, citing above references.

Office Action issued for corresponding Taiwanese Patent Application No. 105136212 dated Mar. 15, 2021, along with an English translation.

Office Action issued for corresponding Chinese Patent Application No. 201680065318.5 dated May 6, 2021, along with an English translation.

Yang et al., "Formulas and Practical Technologies of Fine Chemicals", Hubei Science and Technology Press, 1st edition, p. 203, published on Mar. 31, 1995, along with an English translation.

Textbook Review Committee of Higher Forestry College (School) in East and Central China, "Material Science of Wood Processing (Preliminary Draft)" 1st edition, p. 128, Beijing Forestry Publishing House, Sep. 30, 1959, along with an English translation.

Shi, "Materials Dictionary", Chemical Industry Press, 1st edition, p. 449, Mar. 31, 1994, along with an English translation.

Xiang, "Interior Decoration Materials", China Forestry Publishing House, 1st edition, p. 161, Apr. 30, 2003, along with an English translation.

Office Action issued for corresponding Japanese Patent Application No. 2020-085318 dated Jul. 6, 2021, along with an English machine translation.

Office Action issued for corresponding Chinese patent application No. 201680065318.5 dated Aug. 27, 2021, along with an English machine translation.

* cited by examiner

ADHESION METHOD, ADHESION-STRUCTURE, AND ADHESION KIT

RELATED APPLICATIONS AND INCORPORATION BY REFERENCE

The present patent application is filed pursuant to 35 U.S.C. § 371 as a U.S. National Phase Application of International Patent Application No. PCT/JP2016/082327 filed Oct. 31, 2016, claiming the benefit of priority to Japanese Patent Application No. 2015-219748 filed Nov. 9, 2015. The International Application was published as WO 2017/082106 on May 18, 2017. The contents of each of the aforementioned patent applications are herein incorporated by reference in their entirety.

TECHNICAL FIELD

The present invention relates to an adhesion method, an adhesion-structure, and an adhesion kit. In particular, the present invention relates to an adhesion method, an adhesion-structure in which the adhesion method is used, and an adhesion kit used for the adhesion method.

BACKGROUND ART

Conventionally, a method for using a 2-component adhesive is a known adhesion method, in which two components of a main component (A component) and a curing agent (B component) are mixed and used (for example, see Patent Document 1 below).

In the adhesion method described in Patent Document 1, the main component and the curing agent are weighed individually immediately before use, and they are mixed to prepare a mixture liquid. The mixture liquid is applied on a resin plate to form a coating, and the resin plate is bonded to another resin plate with the coating interposed therebetween.

Thereafter, in the coating, the main component reacts with the curing agent, and the main component is cured, thereby allowing the two resin plates to adhere strongly.

CITATION LIST

Patent Document

Patent Document 1: Japanese Unexamined Patent Publication No. 2000-336333

SUMMARY OF THE INVENTION

Problem to be Solved by the Invention

However, in the adhesion method using the two-component adhesive described in Patent Document 1, the main component and the curing agent have to be individually weighed immediately before use, and mixed. Therefore, there are disadvantages in that the processes are complicated.

An object of the present invention is to provide an adhesion method, by which a first adherend can be adhered to the second adherend easily and strongly; an adhesion-structure in which the first adherend is adhered to a second adherend by the adhesion method; and an adhesion kit used for the adhesion method.

Means for Solving the Problem

The present invention [1] includes an adhesion method including a step (1), disposing a stickable-curable adhesive layer on a first adherend, a step (2), disposing a curing agent layer on a second adherend, the curing agent layer being able to cure the stickable-curable adhesive layer by contacting and reacting with the stickable-curable adhesive layer, and a step (3), bringing the stickable-curable adhesive layer into contact with the curing agent layer so that they are sandwiched by the first adherend and the second adherend.

With the adhesion method, in step (1), the stickable-curable adhesive layer is disposed on the first adherend, and in step (2), the curing agent layer is disposed on the second adherend, and in step (3), the stickable-curable adhesive layer is brought into contact with the curing agent layer so that they are sandwiched by the first adherend and the second adherend, and therefore the first adherend can be adhered to the second adherend easily and strongly without weighing the main component and the curing agent individually and mixing them like the adhesion method in Patent Document 1.

The present invention [2] includes the adhesion method of [1] above, wherein the stickable-curable adhesive layer has a peel adhesion of 1.0N/20 mm or more, when the stickable-curable adhesive layer is bonded to an aluminum plate and peeled off from the aluminum plate at 90 degrees and a speed of 300 mm/min.

With the adhesion method, the stickable-curable adhesive layer has a peel adhesion of the above-described lower limit or more, and therefore the stickable-curable adhesive layer has excellent pressure-sensitive adhesion.

The present invention [3] includes the adhesion method of the above-described [1] or [2], wherein a cured layer is formed by reaction between the stickable-curable adhesive layer and the curing agent layer, the cured layer has a lap-shear adhesion of 1.0 MPa or more, and the lap-shear adhesion is measured by the following test:

Test: the stickable-curable adhesive layer is sandwiched by two polyethylene terephthalate films that were subjected to release treatment, and left at room temperature for one day. Thereafter, one of the polyethylene terephthalate films is peeled off from the stickable-curable adhesive layer, and the peeled stickable-curable adhesive layer is disposed on a first slate plate, and thereafter, the other of the polyethylene terephthalate films is peeled off from the stickable-curable adhesive layer. Separately, the curing agent layer is disposed on a second slate plate. Then, the stickable-curable adhesive layer is brought into contact with the curing agent layer so that they are sandwiched by the first slate plate and the second slate plate, and allowed to stand for 24 hours to form a cured layer, and thereafter, the first slate plate and the second slate plate are pulled in the shear direction at a speed of 5 mm/min, and the strength at the time when the two slate plates peeled off is defined as lap-shear adhesion.

With the adhesion method, the cured layer has a lap-shear adhesion of the above-described lower limit or more, and therefore the first adherend can be adhered to the second adherend even more strongly.

The present invention [4] includes the adhesion method of any one the above-described [1] to [3], wherein the curing agent layer contains 10 mass % or more of the curing agent.

With the adhesion method, the curing agent layer contains the curing agent of the above-described lower limit or more, and therefore the first adherend can be adhered to the second adherend even more strongly.

The present invention [5] includes the adhesion method of any one of the above-described [1] to [4], wherein the stickable-curable adhesive layer contains epoxy resin as a main component.

With the adhesion method, the stickable-curable adhesive layer contains epoxy resin as the main component, and therefore the first adherend can be adhered to the second adherend strongly.

The present invention [6] includes the adhesion method of any one of the above-described [1] to [5], wherein in step (3), the stickable-curable adhesive layer is cured at normal temperature.

With the adhesion method, in step (3), the stickable-curable adhesive layer is cured at normal temperature, and therefore heating for curing the stickable-curable adhesive layer is unnecessary, and the first adherend can be adhered to the second adherend even more easily.

The present invention [7] includes an adhesion kit including a stickable-curable adhesive layer, and a curing agent layer, wherein the curing agent layer is capable of curing the stickable-curable adhesive layer by contacting and reacting with the stickable-curable adhesive layer.

With the adhesion kit, by bringing the stickable-curable adhesive layer into contact with the curing agent layer so that they are sandwiched by the first adherend and the second adherend, the first adherend can be adhered to the second adherend easily and strongly.

The present invention [8] includes an adhesion-structure including a first adherend, a second adherend disposed to face the first adherend, and a cured layer sandwiched by the first adherend and the second adherend, wherein the cured layer is made by reaction between the stickable-curable adhesive layer and the curing agent layer.

With the adhesion-structure, the first adherend is strongly adhered to the second adherend by the cured layer.

Effects of the Invention

With adhesion method of the present invention, the first adherend can be adhered to the second adherend strongly with an easy method of bringing the stickable-curable adhesive layer into contact with the curing agent layer.

With the adhesion kit of the present invention, the first adherend can be adhered to the second adherend easily and strongly.

The adhesion-structure of the present invention includes the cured layer formed by reaction of the stickable-curable adhesive layer and the curing agent layer disposed to be sandwiched by the first adherend and the second adherend, and therefore the first adherend can be strongly adhered to the second adherend.

DESCRIPTION OF THE EMBODIMENTS

1. Embodiment of Adhesion Method

An embodiment of the adhesion method of the present invention is described with reference to FIG. 1A and FIG. 1B.

The adhesion method includes a step (1) (ref: FIG. 1A) in which the stickable-curable adhesive layer 1 is disposed on the first adherend 2, a step (2) (ref: FIG. 1A) in which the curing agent layer 3 is disposed on the second adherend 4, the curing agent layer 3 capable of curing the stickable-curable adhesive layer 1 by making contact and reacting with the stickable-curable adhesive layer 1, and a step (3)(ref: FIG. 1B) in which the stickable-curable adhesive layer 1 is brought into contact with the curing agent layer 3 so that they are sandwiched by the first adherend 2 and the second adherend 4.

Each step is described in the following.

1-1. Step (1)

Figure 1A:
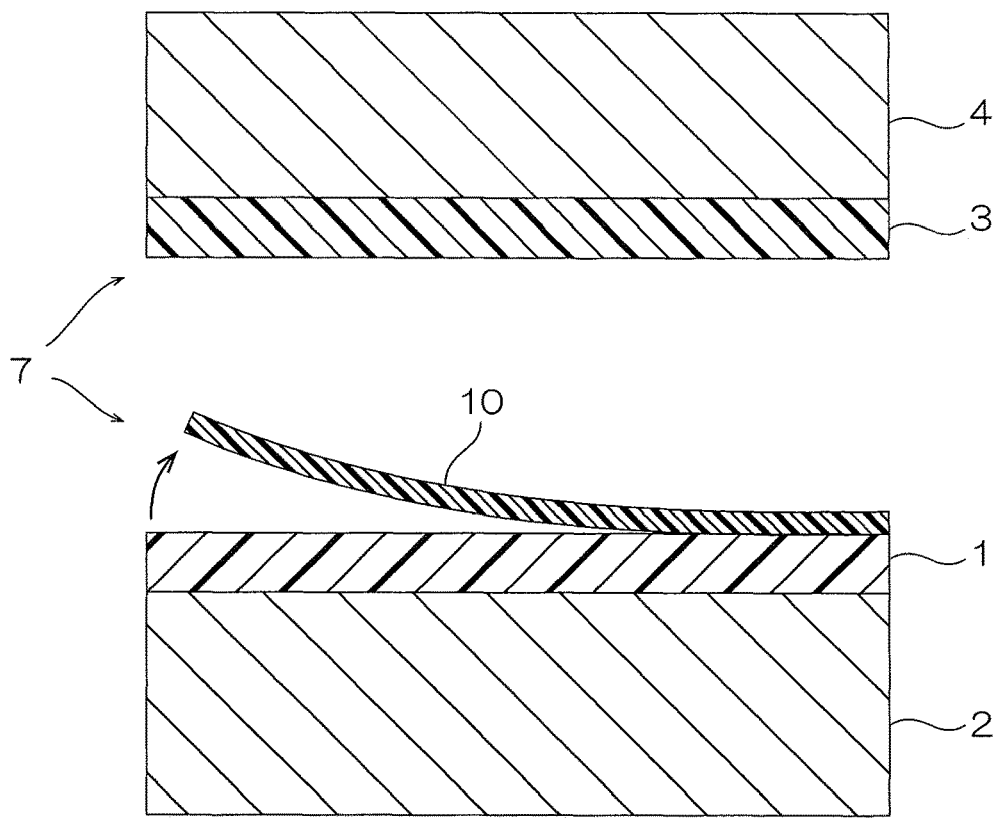
FIG. 1A and FIG. 1B are process diagrams illustrating an embodiment of the adhesion method of the present invention, FIG. 1A illustrating a step (1) of disposing the stickable-curable adhesive layer on the first adherend, a step (2) of disposing the curing agent layer on the second adherend, and FIG. 1B illustrating a step (3) of bringing the stickable-curable adhesive layer into contact with the curing agent layer so that they are sandwiched by the first adherend and the second adherend.

In step (1), as shown in FIG. 1A, the stickable-curable adhesive layer 1 is disposed on the first adherend 2.

The stickable-curable adhesive layer 1 is a layer (sheet) that is cured by making contact and reacting with the curing agent layer 3; extends in a surface direction (direction perpendicular to thickness direction); and has a substantially flat plate shape having flat top surface and bottom surface.

To dispose the stickable-curable adhesive layer 1 on the first adherend 2, for example, first, the stickable-curable adhesive layer 1 is formed on the surface of a release film 10.

To form the stickable-curable adhesive layer 1 on the surface of the release film 10, first, the stickable-curable adhesive composition is prepared.

The stickable-curable adhesive composition is not particularly limited as long as it is a main component of the two-component adhesive and it can form a layer, and examples thereof include a silicone compound; polyol compounds such as polypropylene glycol; urethane resin; and epoxy resin. The stickable-curable adhesive composition preferably contains epoxy resin as the main component. The first adherend 2 can be allowed to adhere to the second adherend 4 easily and strongly.

Examples of the epoxy resin include bisphenol epoxy resin such as bisphenol A epoxy resin, bisphenol F epoxy resin, bisphenol S epoxy resin, and hydrogenated bisphenol A epoxy resin; naphthalene epoxy resin; biphenyl epoxy resin; dicyclo epoxy resin; alicyclic epoxy resin; triglycidylisocyanurate epoxy resin; hydantoin epoxy resin; glycidyl ether epoxy resin; and glycidylamino epoxy resin.

For the epoxy resin, preferably, bisphenol epoxy resin, more preferably bisphenol A epoxy resin is used.

The epoxy resin can be used singly, or can be used in combination of two or more.

The epoxy resin can be any of liquid, semi-solid, or solid under normal temperature, but preferably, a semi-solid epoxy resin is used singly, or a liquid epoxy resin and a solid epoxy resin are used in combination. A layered and tacky stickable-curable adhesive layer 1 can be formed from the stickable-curable adhesive composition reliably in this manner.

The liquid epoxy resin under normal temperature is, specifically, is liquid at 25° C. The liquid epoxy resin has a viscosity of, under 25° C., for example, 30 Pa·s or more, preferably 80 Pa·s or more, and for example, 500 Pa·s or less, preferably 300 Pa·s or less.

The epoxy resin that is solid under normal temperature is solid, specifically under 25° C. The solid epoxy resin has a softening point of, for example, 70° C. or more, preferably 75° C. or more.

The blending ratio of the liquid epoxy resin relative to the solid epoxy resin (liquid epoxy resin/solid epoxy resin) is, for example, 1.0 or more, preferably 1.5 or more, and for example, 4.0 or less, preferably 3.0 or less.

When the blending ratio of the liquid epoxy resin relative to the solid epoxy resin is the above-described lower limit or more, the viscosity of the stickable-curable adhesive composition can be reduced to prevent coating unevenness, and homogenous stickable-curable adhesive layer 1 can be produced. When the blending ratio of the liquid epoxy resin relative to the solid epoxy resin is the above-described upper limit or less, tacky and layered stickable-curable adhesive layer can be produced.

The blending ratio of the epoxy resin is set in the stickable-curable adhesive composition so that the epoxy resin is the main component, specifically, relative to the stickable-curable adhesive composition, for example, 80 mass % or more, preferably 90 mass % or more, and for example, 100 mass % or less.

Preferably, the stickable-curable adhesive composition consists of epoxy resin. That is, 100 mass % of the epoxy resin is blended relative to the stickable-curable adhesive composition.

As necessary, an acrylic polymer can be blended to the stickable-curable adhesive composition.

The cohesive force of the stickable-curable adhesive composition can be improved in this manner.

The acrylic polymer can be produced by allowing a monomer component containing (meth)acrylate to react.

Examples of the (meth)acrylate include alkylmethacrylate and/or alkylacrylate, and to be specific, alkyl (meth)acrylate having 1 to 20 carbon atoms including methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, n-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate.

For the (meth)acrylate, preferably, alkyl (meth)acrylate having 2 to 14 carbon atoms, more preferably, alkyl (meth)acrylate having 4 to 9 carbon atoms are used.

(Meth)acrylate can be used singly, or can be used in combination of two or more.

The (meth)acrylate is blended in an amount of, relative to the monomer component, for example, 70 mass % or more, preferably 80 mass % or more, and for example, 99 mass % or less, preferably 98 mass % or less.

The monomer component can further contain a copolymerizable monomer that is copolymerizable with (meth)acrylate.

Examples of the copolymerizable monomer include carboxyl group-containing monomer including (meth) acrylic acid, itaconic acid, maleic acid, crotonic acid, and maleic anhydride, and acid anhydride thereof; hydroxyl group-containing (meth)acrylate such as 2-hydroxyethyl (meth)acrylate and 3-hydroxypropyl (meth)acrylate; amide group-containing monomer including (meth) acrylamide, N,N-dimethyl (meth) acrylamide, N-methylol (meth) acrylamide, N-methoxymethyl (meth) acrylamide, and N-butoxymethyl (meth) acrylamide; vinyl esters such as vinyl acetate; aromatic vinyl compounds such as styrene and vinyltoluene; (meth) acrylonitrile; N-(meth) acryloylmorpholine; and N-vinyl-2-pyrrolidone.

For the copolymerizable monomer, preferably, carboxyl group-containing monomer, hydroxyl group-containing (meth)acrylate, more preferably (meth) acrylic acid, and 2-hydroxyethyl (meth)acrylate are used.

These copolymerizable monomers can be used singly, or can be used in combination of two or more. Preferably, the carboxyl group-containing monomer and the hydroxyl group-containing (meth)acrylate are used in combination, more preferably, (meth) acrylic acid and 2-hydroxyethyl (meth)acrylate are used in combination.

The blending ratio of the copolymerizable monomer relative to 100 parts by mass of the (meth)acrylate is, for example, 0.1 parts by mass or more, preferably 0.3 parts by mass or more, and for example, 15 parts by mass or less, preferably 10 parts by mass or less.

To allow the monomer component to react, for example, (meth)acrylate is blended with, as necessary, the copolymerizable monomer to prepare a monomer component, and the monomer component is subjected to a known polymerization method, such as, for example, solution polymerization, bulk polymerization, emulsion polymerization, and various radical polymerization.

For the polymerization method, preferably, solution polymerization is used.

In solution polymerization, for example, the monomer component and the polymerization initiator is blended with a solvent to prepare a monomer solution, and thereafter, the monomer solution is heated.

Examples of the solvent include organic solvent. Examples of the organic solvent include aromatic solvents such as toluene, benzene, and xylene; ether solvents such as ethyl acetate; ketone solvents such as acetone and methyl ethyl ketone; ester solvents such as ethyl acetate; amide solvents such as N,N-dimethylformamide. The solvent can be used singly, or two or more solvents can be used in combination, and preferably an aromatic solvent and an ether solvent can be used in combination. The blending ratio of the solvent relative to 100 parts by mass of the monomer component is, for example, 10 parts by mass or more, preferably 50 parts by mass or more, and for example, 1000 parts by mass or less, preferably 500 parts by mass or less.

Examples of the polymerization initiator include peroxide polymerization initiator and azo polymerization initiator.

Examples of the peroxide polymerization initiator include organic peroxides such as peroxycarbonate, ketoneperoxide, peroxyketal, hydroperoxide, dialkylperoxide, diacylperoxide, and peroxyester.

Examples of the azo polymerization initiator include azo compounds such as 2,2'-azobisisobutyronitrile, 2,2'-azobis (2-methylbutyronitrile), 2,2'-azobis(2,4-dimethylvaleronitrile), and 2,2'-azobis dimethyl isobutyrate.

For the polymerization initiator, preferably, azo polymerization initiators are used.

The blending ratio of the polymerization initiator relative to 100 parts by mass of the monomer component is, for example, 0.01 parts by mass or more, preferably 0.05 parts by mass or more, and for example, 5 parts by mass or less, preferably 3 parts by mass or less.

The heating temperature is, for example, 50° C. or more, and 80° C. or less, and the heating time is, for example, 1 hour or more, and 24 hours or less.

In this manner, the monomer component is polymerized, and an acrylic polymer solution containing acrylic polymer is produced.

The acrylic polymer solution is blended with epoxy resin so that the acrylic polymer is, for example, 20 parts by mass or more, preferably 30 parts by mass or more, and for example, 90 parts by mass or less, preferably 80 parts by mass or less relative to 100 parts by mass of the stickable-curable adhesive composition. The acrylic polymer is blended in an amount of, relative to 100 parts by mass of the epoxy resin, for example, 50 parts by mass or more, preferably 150 parts by mass or more, more preferably 200 parts by mass or more, and for example, 300 parts by mass or less, preferably 250 parts by mass or less.

When the blending ratio of the acrylic polymer is the above-described lower limit or more, cohesive force, and furthermore, pressure-sensitive adhesion of the stickable-curable adhesive composition can be improved, and peel adhesion of the stickable-curable adhesive layer 1 can be improved.

When the blending ratio of the acrylic polymer is the above-described upper limit or less, curing can be achieved.

To the stickable-curable adhesive composition, a trace amount of a curing agent can also be blended.

This allows for improvement in cohesive force of the stickable-curable adhesive layer 1.

Examples of the curing agent are shown later.

The blending ratio of the curing agent is adjusted so as to achieve improvement in peel adhesion of the stickable-curable adhesive layer 1, and to achieve slight curing (not completely cured) of the stickable-curable adhesive composition. The blending ratio of the curing agent relative to 100 parts by mass of the epoxy resin is, to be specific, 0.05 parts by mass or more, preferably 0.15 parts by mass or more, and for example, 5 parts by mass or less, preferably 3 parts by mass or less. When the curing agent is an imidazole compound to be described later, the curing agent is blended in an amount relative to 100 parts by mass of the epoxy resin of, to be specific, 0.05 parts by mass or more, preferably 0.15 parts by mass or more, and for example, 5 parts by mass or less, preferably 3 parts by mass or less. When the curing agent is an amine compound to be described later, relative to 100 parts by mass of the epoxy resin, the curing agent is blended in an amount of, for example, 30 parts by mass or less, preferably 15 parts by mass or less, more preferably 10 parts by mass or less.

When the blending ratio of the curing agent is the above-described lower limit or more, peel adhesion of the stickable-curable adhesive layer 1 can be improved. When the blending ratio of the curing agent is the above-described upper limit or less, complete curing of the stickable-curable adhesive layer 1 can be suppressed, reduction in reactivity between the stickable-curable adhesive layer 1 and the curing agent layer 3 can be suppressed, and the cured layer 5 to be described later can be formed reliably.

To produce the stickable-curable adhesive composition, for example, epoxy resin is blended with, as necessary, an acrylic polymer (acrylic polymer solution) and/or a curing agent, and as necessary, the mixture is diluted with a solvent to prepare a varnish.

The solvent is not limited as long as it can dissolve the stickable-curable adhesive composition, and for example, the above-described solvents can be used. For the solvent, preferably, ketone solvent is used.

The varnish has a stickable-curable adhesive composition concentration of, for example, 20 mass % or more, preferably 40 mass % or more, and for example, 80 mass % or less, preferably 70 mass % or less.

When an acrylic polymer is blended into the stickable-curable adhesive composition, a cross-linking agent can be blended when the stickable-curable adhesive composition is prepared.

Examples of the cross-linking agent include an isocyanate cross-linking agent, an aziridine cross-linking agent, an epoxy cross-linking agent, and a metal chelate cross-linking agent, and preferably, an isocyanate cross-linking agent is used.

Examples of the isocyanate cross-linking agent include aromatic diisocyanates such as tolylene diisocyanate and xylenediisocyanate; alicyclic diisocyanates such as isophoronediisocyanate; aliphatic diisocyanates such as hexamethylene diisocyanate; and modified product of these isocyanates (to be specific, tolylene diisocyanate adduct of trimethylolpropane, etc).

For the cross-linking agent, preferably, modified products of isocyanate are used.

The cross-linking agent is blended in an amount of, relative to 100 parts by mass of the acrylic polymer, for example, 1 part by mass or more, preferably 5 parts by mass or more, and for example, 20 parts by mass or less, preferably 15 parts by mass or less.

The stickable-curable adhesive composition is prepared in this manner.

Thereafter, the stickable-curable adhesive composition is applied on the surface of the release film 10, and thereafter, dried.

The release film 10 is, for example, a substantially rectangular flat-plate-shaped release sheet, and is formed into a shape having a flat top face and a flat bottom face.

The release film 10 is formed into a film from resin materials such as vinyl polymers including polyolefins (to be specific, polyethylene, polypropylene) and ethylene-vinyl acetate copolymer (EVA); polyesters including polyethylene terephthalate and polycarbonate; and fluorine resin including polytetrafluoroethylene. The release film 10 also can be formed from metal materials such as iron, aluminum, and stainless steel.

For the release film 10, preferably, polyester film, more preferably, polyethylene terephthalate film is used.

The surface of the release film 10 can be subjected to, as necessary, treatment for release.

The release film 10 has a thickness of, for example, 10 μm or more, and 1000 μm or less.

Examples of the application method include doctor blade method, roll method, screen method, and gravure method.

The heating conditions are as follows: the heating temperature is, for example, 70° C. or more, and 130° C. or less. The heating time is, for example, 1 minute or more and 5 minutes or less.

When the stickable-curable adhesive composition contains the cross-linking agent, the acrylic polymer is cross-linked by the cross-linking agent with further heating after the above-described heating. The temperature in the further heating is, 30° C. or more, and 60° C. or less, and the time is, for example, 1 hour or more, preferably 1 day or more.

When the stickable-curable adhesive composition contains the curing agent, the heating temperature is 70° C. or more, and 160° C. or less, and the heating time is, 5 minutes or more, and 5 hours or less. This allows for the entire curing agent to react with a portion of epoxy resin.

The stickable-curable adhesive layer 1 can be formed on the surface on the release film 10 from the stickable-curable adhesive composition.

The stickable-curable adhesive layer 1 has a thickness of, for example, 1 μm or more, preferably 5 μm or more, more preferably 10 μm or more, and for example, 1000 μm or less, preferably 500 μm or less, more preferably 100 μm or less.

As necessary, another release film (not shown) can be disposed on (allowed to contact with) the surface of the stickable-curable adhesive layer 1 (surface opposite to the contact surface where it makes contact with the release film 10).

That is, the stickable-curable adhesive layer 1 can be sandwiched by two release films.

The stickable-curable adhesive layer 1 has pressure-sensitive adhesiveness (pressure-sensitive adhesion or initial adhesive strength).

To be specific, the stickable-curable adhesive layer 1 has a peel adhesion to an aluminum plate of, for example, 1.0N/20 mm or more, preferably 2.4N/20 mm or more, and more preferably 3.0N/20 mm or more, and for example, 10N/20 mm or less.

When the stickable-curable adhesive layer 1 has a peel adhesion to the aluminum plate of the above-described lower limit or more, the stickable-curable adhesive layer 1 has excellent pressure-sensitive adhesiveness.

The peel adhesion of the stickable-curable adhesive layer 1 is determined by bonding the stickable-curable adhesive layer 1 to the aluminum plate, and thereafter, the stickable-curable adhesive layer 1 is peeled off from the aluminum plate at 90 degrees and at a speed of 300 mm/min.

When the stickable-curable adhesive layer 1 is tested by a 24 hour constant load test, the time it takes until the polyethylene terephthalate film is peeled (peeling time) is, for example, 1 hour or more, preferably 5 hours or more, and for example, 24 hours or less.

When the peeling time is the above-described lower limit or more, the stickable-curable adhesive layer 1 has excellent pressure-sensitive adhesiveness.

The constant load test is described in Examples later on.

Thereafter, the stickable-curable adhesive layer 1 is transferred to the surface of the first adherend 2 from the release film 10. To be specific, first, the stickable-curable adhesive layer 1 is allowed to contact the first adherend 2, and then as shown with the arrow in FIG. 1A, the release film 10 is peeled off from the stickable-curable adhesive layer 1.

The release film 10 can also be peeled off from the stickable-curable adhesive layer 1 after step (2), immediately before the step (3).

When the stickable-curable adhesive layer 1 is sandwiched by the two release films, for example, first, one release film is peeled off. Then, the exposed face of the stickable-curable adhesive layer 1 is allowed to contact the first adherend 2, and then, as shown with the arrow in FIG. 1A, the release film 10 is peeled off from the stickable-curable adhesive layer 1.

The first adherend 2 is not particularly limited, and examples thereof include metal, glass, plastic, slate, mortar, concrete, rubber, woods, leather, fabric, and paper.

For the first adherend 2, preferably slate, mortar, or concrete is used.

In this manner, as shown in FIG. 1A, the stickable-curable adhesive layer 1 is disposed on the first adherend 2.

1-2. Step (2)

The curing agent layer 3 is a layer (sheet) that is capable of curing the stickable-curable adhesive layer 1 by contacting and reacting with the stickable-curable adhesive layer 1, that extends in the surface direction (direction perpendicular to thickness direction), and has a substantially flat plate shape having a flat top surface and bottom surface.

In step (2), as shown in FIG. 1A, the curing agent layer 3 is disposed on the second adherend 4.

To dispose the curing agent layer 3 on the second adherend 4, for example, first, the curing agent component is prepared.

The curing agent component contains a curing agent.

The curing agent is not particularly limited as long as it is a curing agent that is capable of forming a layer and is for a two-component adhesive. When the stickable-curable adhesive composition is a silicone compound, examples thereof include a silicone compound. When the stickable-curable adhesive composition is a polyol compound, isocyanate is used. When it is urethane resin, urethane resin curing agent is used. When epoxy resin is used, for example, epoxy resin curing agents such as an imidazole compound and an amine compound are used.

Examples of the imidazole compound include methyl imidazole, 2-ethyl-4-methyl imidazole, 1-isobutyl-2-methyl imidazole, 1-benzyl-2-methyl imidazole, 2-ethyl-4-methyl imidazole, ethylimidazole, isopropyl imidazole, 2,4-dimethyl imidazole, phenylimidazole, undecylimidazole, heptadecylimidazole, 2-phenyl-4-methyl imidazole, 2-phenyl-4,5-dihydroxymethyl imidazole, and 2-phenyl-4-methyl-5-hydroxymethyl imidazole, and preferably, 1-isobutyl-2-methyl imidazole, 1-benzyl-2-methyl imidazole, and 2-ethyl-4-methyl imidazole are used, more preferably, 1-isobutyl-2-methyl imidazole, 1-benzyl-2-methyl imidazole, further more preferably 1-isobutyl-2-methyl imidazole are used.

Examples of the amine compound include ethylene diamine, propylene diamine, diethylene triamine, triethylenetetramine, their amine adducts, metaphenylenediamine, diaminodiphenylmethane, and diaminodiphenyl sulfone.

For the curing agent, preferably, an imidazole compound is used.

The curing agent can be used singly, or can be used in combination of two or more.

The curing agent is blended in an amount of, relative to the curing agent component, for example, 10 mass % or more, preferably 30 mass % or more, more preferably 50 mass % or more, even more preferably 80 mass % or more, particularly preferably 90 mass % or more, and for example, 100 mass % or less. When the blending ratio of the curing agent is the above-described lower limit or more, the stickable-curable adhesive layer 1 with excellent adhesion can be achieved.

Preferably, the curing agent component consists of the curing agent, that is, the percentage of the curing agent is, relative to the curing agent component, 100 mass %.

To the curing agent component, as necessary, the above-described epoxy resin can be blended.

The blending ratio of the epoxy resin relative to 100 parts by mass of the curing agent is, 30 parts by mass or more, preferably 40 parts by mass or more, and for example, 70 parts by mass or less.

When the blending ratio of the epoxy resin is the above-described upper limit or less, in step (2), reaction of substantially the entire curing agent with the epoxy resin can be prevented in the curing agent layer 3, and in step (3), reduction in reactivity of the (curing agent of) curing agent layer 3 with the (epoxy resin of) stickable-curable adhesive layer 1 can be prevented.

To prepare the curing agent component, the curing agent is blended with, as necessary, epoxy resin to prepare varnish.

When the curing agent is solid, as necessary, the curing agent can be dissolved with a solvent to prepare varnish.

Those solvents that are capable of dissolving the stickable-curable adhesive composition will suffice, and for example, the above-described solvent can be used.

The varnish has a curing agent component concentration of, for example, 10 mass % or more, preferably 20 mass % or more, and for example, 90 mass % or less, preferably 50 mass % or less.

The curing agent component is prepared in this manner.

Thereafter, the curing agent component is applied on the second adherend 4. To be specific, the varnish of the curing agent component is applied on the second adherend 4.

The second adherend 4 is not particularly limited, and the above-described adherend can be used.

The application method can be, for example, the above-described methods.

Thereafter, as necessary, excess varnish of the curing agent component on the surface of the second adherend 4 is removed. For example, excess varnish of the curing agent component on the surface of the second adherend 4 is wiped off.

Then, when the varnish contains a solvent, the varnish is dried to remove the solvent.

In this manner, the curing agent layer 3 is formed on the surface of the second adherend 4, and the curing agent layer 3 is disposed on the second adherend 4.

The curing agent layer 3 has a thickness of, for example, 1 μm or more, preferably 5 μm or more, more preferably 10 μm or more, and for example, 1000 μm or less, preferably 800 μm or less, more preferably 500 μm or less.

In this manner, an adhesion kit 7 including the stickable-curable adhesive layer 1 disposed on the first adherend 2 and the curing agent layer 3 disposed on the second adherend 4 is prepared.

1-3. Step (3)

Figure 1B:
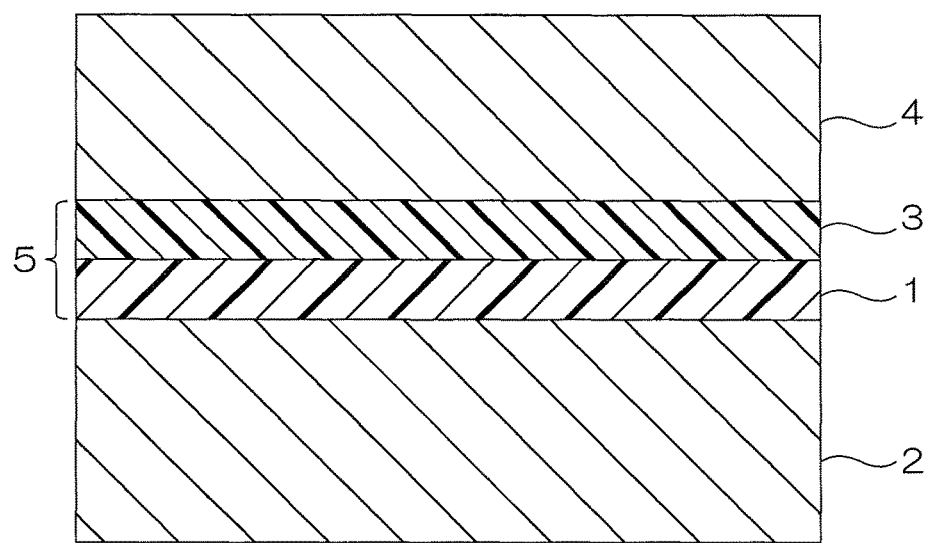

In step (3), as shown in FIG. 1B, the stickable-curable adhesive layer 1 is allowed to contact the curing agent layer 3 so that they are sandwiched by the first adherend 2 and the second adherend 4.

That is, the first adherend 2 and the second adherend 4 are placed on top of the other so that the stickable-curable adhesive layer 1 and the curing agent layer 3 are contacting each other.

Then, the contact between the stickable-curable adhesive layer 1 and the curing agent layer 3 causes reaction.

The reaction temperature is, for example, normal temperature.

As necessary, the stickable-curable adhesive layer 1 and the curing agent layer 3 can be heated, and the heating temperature is, for example, 50° C. or more, preferably 70° C. or more, and for example, 130° C. or less, preferably 110° C. or less.

The reaction temperature is, preferably normal temperature. The normal temperature is, the temperature without the above-described heating (for example, heating at 50° C. or more) for allowing the stickable-curable adhesive layer 1 and the curing agent layer 3 to react, and for example, less than 50° C., preferably 40° C. or less, and for example, 10° C. or more, preferably 20° C. or more.

When the reaction temperature is normal temperature, heating for causing the reaction between the stickable-curable adhesive layer 1 and the curing agent layer 3 is not necessary, and the first adherend 2 can be adhered to the second adherend 4 even more simply.

The reaction time is, for example, 1 hour or more, preferably 12 hours or more, and for example, 96 hours or less, preferably 48 hours or less.

The stickable-curable adhesive layer 1 is cured in this manner to be a cured layer 5. Preferably, the stickable-curable adhesive layer 1 is cured at normal temperature.

In FIG. 1B, a boundary is formed between the stickable-curable adhesive layer 1 and the curing agent layer 3, but the cured layer 5 is a layer formed by integration of and reaction between the stickable-curable adhesive layer 1 and the curing agent layer 3, and the above-described boundary is not present.

The cured layer 5 allows the first adherend 2 and the second adherend 4 to adhere to each other.

The cured layer 5 has a lap-shear adhesion of, for example, 0.1 MPa or more, preferably 0.4 MPa or more, more preferably 0.6 MPa or more, further preferably 0.7 MPa or more, particularly preferably 1.0 MPa or more, most preferably 2.3 MPa or more, furthermore, 2.5 MPa or more, furthermore, 3.5 MPa or more.

When the cured layer 5 has a lap-shear adhesion of the above-described lower limit or more, the stickable-curable adhesive layer has excellent adhesion, and is capable of reliably allowing the first adherend 2 and the second adherend 4 to adhere to each other.

The lap-shear adhesion of the cured layer 5 is measured by the following method. The stickable-curable adhesive layer 1 is sandwiched by two polyethylene terephthalate films that were subjected to release treatment, and they are allowed to stand at room temperature for one day. Thereafter, one polyethylene terephthalate film is peeled off from the stickable-curable adhesive layer 1, and the peeled stickable-curable adhesive layer 1 is disposed on the first slate plate, and thereafter, the other polyethylene terephthalate film is peeled off from the stickable-curable adhesive layer 1. Separately, the curing agent layer 3 is disposed on the second slate plate. Then, the stickable-curable adhesive layer 1 and the curing agent layer 3 are allowed to contact each other so that they are sandwiched by the first slate plate and the second slate plate, and they are allowed to stand for 24 hours to form a cured layer 5. Thereafter, the first slate plate and the second slate plate are pulled in the sear direction at a speed of 5 mm/min. The strength at which the two slate plates are peeled off is determined as a lap-shear adhesion.

An adhesion-structure 6 is produced in this manner.

That is, the adhesion-structure 6 includes the first adherend 2, and the second adherend 4 disposed to face the first adherend 2, and the cured layer 5 sandwiched by these.

In the adhesion-structure 6, the first adherend and the second adherend are strongly adhered to each other by the cured layer 5.

2. Operations and Effects of First Embodiment

With the adhesion method, as shown in FIG. 1A, in step (1), the stickable-curable adhesive layer 1 is disposed on the first adherend 2, in step (2), the curing agent layer 3 is disposed on the second adherend 4, as shown in FIG. 1B, and in step (3), the stickable-curable adhesive layer 1 is allowed to contact the curing agent layer 3 so that they are sandwiched by the first adherend 1 and the second adherend 4. Therefore, the first adherend 2 and the second adherend 4 are allowed to adhere to each other easily and strongly.

Figure 2A:
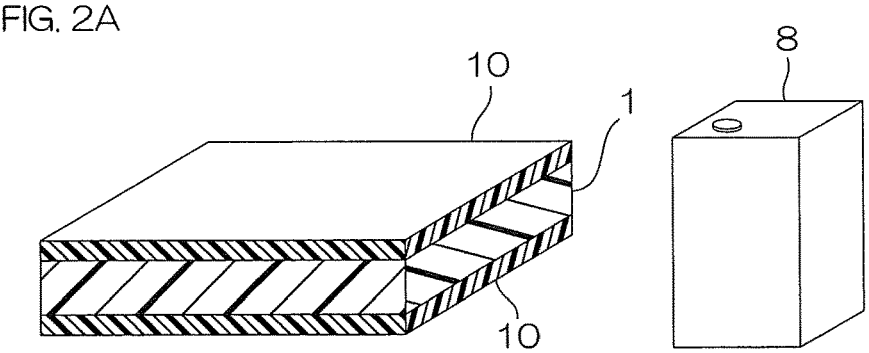
FIG. 2A to FIG. 2D are process diagrams illustrating the embodiment shown in FIG. 1A and FIG. 1B in detail, FIG. 2A showing a step of preparing the stickable-curable adhesive layer and the curing agent component, FIG. 2B showing a step of transferring the stickable-curable adhesive layer to the first adherend, FIG. 2C showing a step of applying the curing agent component to the second adherend, and FIG. 2D showing a step of placing the first adherend on the second adherend.

That is, in this method, as shown in FIG. 2A, the stickable-curable adhesive layer 1 sandwiched by two release films 10 is prepared by the above-described method.

Separately, the varnish of the curing agent component is prepared, and as shown in FIG. 2A, the varnish of the curing agent component is stored in the vessel 8.

In this manner, as shown in FIG. 2A, the stickable-curable adhesive layer 1 and the curing agent component are prepared.

Then, the stickable-curable adhesive layer 1 and the curing agent component are transported to a place of use.

Figure 2B:
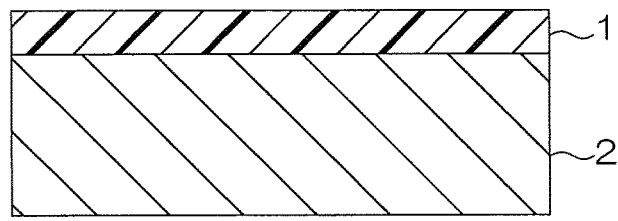

Thereafter, one release film 10 is released, and then, as shown in FIG. 2B, the stickable-curable adhesive layer 1 is transferred to the first adherend 2 from the other release film 10.

Figure 2C:
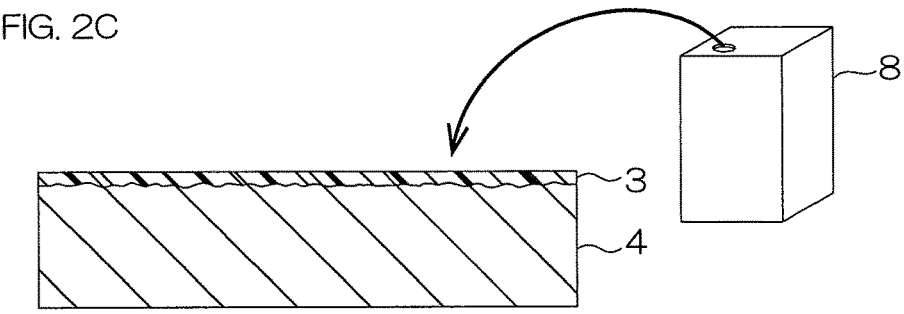

Separately, as shown in FIG. 2C, the varnish of the curing agent component is applied to the second adherend 4. To be specific, the curing agent component is taken out from the vessel 8, and the varnish of the curing agent component is applied on the second adherend 4 by, for example, spray or brush. Then, the varnish of the curing agent component penetrates into the upper end portion of the second adherend 4. Thereafter, as necessary, the excess curing agent component remained on the surface of the second adherend 4 is wiped off.

In this manner, as shown in FIG. 2C, the curing agent layer 3 composed of the curing agent component is formed on the upper end portion of the second adherend 4.

When the curing agent component is present on the surface of the second adherend 4, the curing agent layer 3 (not shown) is formed by the curing agent component present on the surface of the second adherend 4 and the curing agent component penetrated into the upper end portion of the second adherend 4.

Figure 2D:
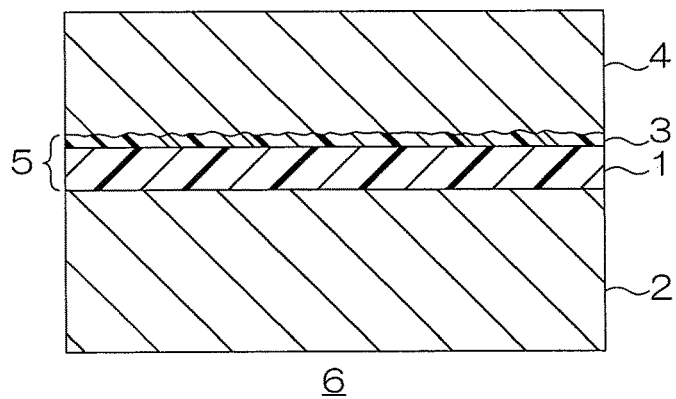

Then, as shown in FIG. 2D, the first adherend 2 and the second adherend 4 are placed, one on top of the other so that the stickable-curable adhesive layer 1 and the curing agent layer 3 make contact with each other.

With the adhesion method, when peel adhesion of the stickable-curable adhesive layer 1 is the above-described lower limit or more, the stickable-curable adhesive layer 1 has excellent pressure-sensitive adhesion (initial adhesion).

With the adhesion method, when lap-shear adhesion of the cured layer 5 is the above-described lower limit or more, the first adherend 2 and the second adherend 4 can be allowed to adhere to each other even more strongly.

With the adhesion method, when the curing agent layer 3 contains the curing agent of the above-described lower limit or more, the first adherend 2 and the second adherend 4 can be allowed to adhere to each other even more strongly.

Furthermore, with the adhesion method, when the stickable-curable adhesive layer 1 contains epoxy resin as main component, the first adherend 2 and the second adherend 4 can be allowed to adhere to each other strongly.

With the adhesion method, in step (3), when the stickable-curable adhesive layer 1 is cured at normal temperature, heating for curing the stickable-curable adhesive layer 1 is unnecessary, and the first adherend 2 and the second adherend 4 can be allowed to adhere to each other even more simply.

With the adhesion kit 7, by allowing the stickable-curable adhesive layer 1 and the curing agent layer 3 to contact each other so that they are sandwiched by the first adherend 2 and the second adherend 4, the first adherend 2 and the second adherend 4 can be allowed to adhere to each other easily and strongly.

With the adhesion-structure 6, the first adherend 2 and the second adherend 4 are allowed to adhere to each other by the cured layer 5.

3. Modified Example

Modified Example of the first embodiment is described with reference to FIG. 3A to FIG. 3C.

In Modified Examples below, the members that are the same as those described above are given the same reference numerals, and detailed description thereof is omitted.

Figure 3A:
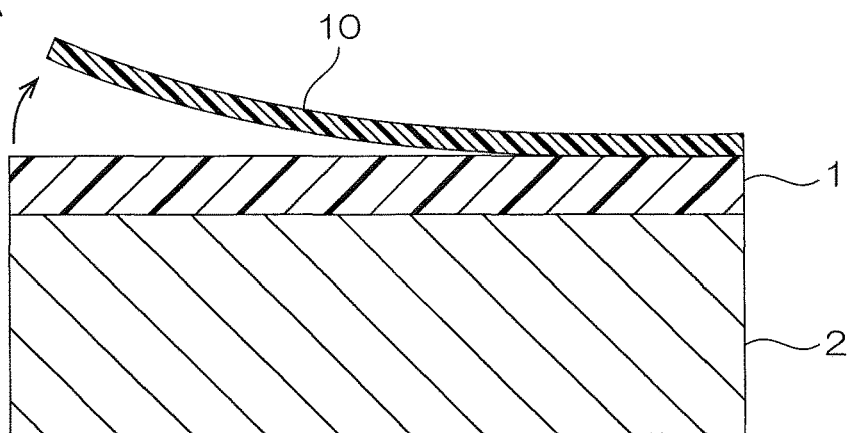
FIG. 3A to FIG. 3C are process diagrams illustrating a modified embodiment example of the embodiment shown in FIG. 1A and FIG. 1B, FIG. 3A illustrating a step (1) of disposing the stickable-curable adhesive layer on the first adherend, FIG. 3B illustrating a step of disposing the curing agent layer on the stickable-curable adhesive layer, and FIG. 3C illustrating a step (3) of disposing the second adherend to the curing agent layer.
Figure 3B:
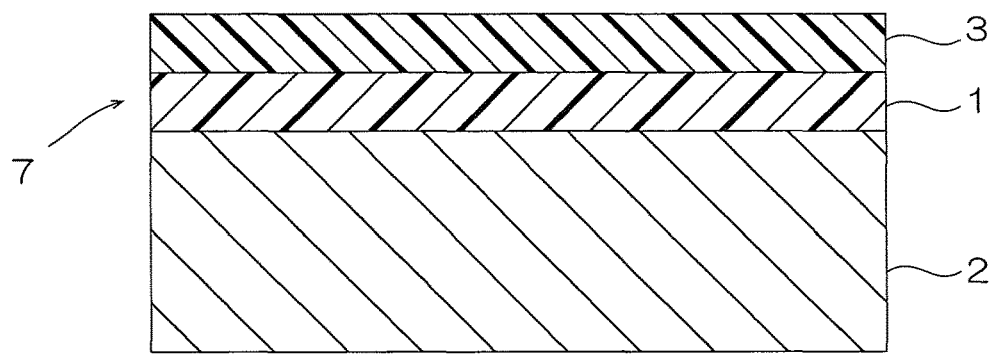

In the first embodiment, as shown in FIG. 1A, the stickable-curable adhesive layer 1 and the curing agent layer 3 are disposed on the first adherend 2 and the second adherend 4, respectively, but in Modified Example, as shown in FIG. 3B, the stickable-curable adhesive layer 1 and the curing agent layer 3 are disposed sequentially on the surface of the first adherend 2.

In Modified Example, first, as shown in FIG. 3A, the stickable-curable adhesive layer 1 is disposed on the surface of the first adherend 2.

Then, as shown in FIG. 3B, the curing agent layer 3 is disposed on the surface of the stickable-curable adhesive layer 1.

To dispose the curing agent layer 3 on the surface of the stickable-curable adhesive layer 1, for example, the varnish of the curing agent component is applied on the surface of the stickable-curable adhesive layer 1. Alternatively, the varnish of the curing agent component is applied on the surface of the release sheet (not shown), and as necessary, dried. In this manner, the curing agent layer 3 is formed on the surface of the release sheet. Thereafter, the curing agent layer 3 is transferred on the surface of the stickable-curable adhesive layer 1 from the release sheet.

Figure 3C:
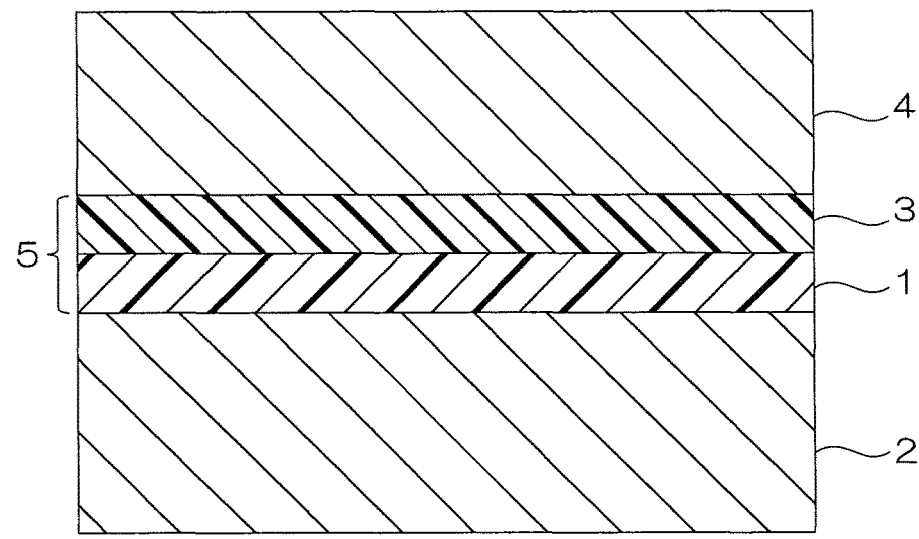

Then, as shown in FIG. 3C, the second adherend 4 is disposed on the surface of the curing agent layer 3. In this manner, the stickable-curable adhesive layer 1 and the curing agent layer 3 are sandwiched by the first adherend 2 and the second adherend 4. Then, the cured layer 5 is formed, and this produces the adhesion-structure 6 in which the first adherend 2 and the second adherend 4 are adhered to each other.

In the description above, as shown in FIG. 3B, the stickable-curable adhesive layer 1 and the curing agent layer 3 are disposed on the surface of the first adherend 2 sequentially, but for example, although not shown, the curing agent layer 3 and the stickable-curable adhesive layer 1 can be disposed on the surface of the first adherend 2 sequentially.

In the first embodiment, as shown in FIG. 1A, the adhesion kit 7 includes the stickable-curable adhesive layer 1 disposed (supported) on the first adherend 2 and the curing agent layer 3 disposed (supported) on the second adherend 4, but it is not limited thereto. That is, in the adhesion kit 7, the support for the stickable-curable adhesive layer 1 and the curing agent layer 3 is not particularly limited.

That is, in the adhesion kit 7, the stickable-curable adhesive layer 1 and the curing agent layer 3 both formed into layers will suffice, and for example, the stickable-curable adhesive layer 1 and/or curing agent layer 3 can be formed (supported) on the surface of the release film (not shown).

A plurality of stickable-curable adhesive layers 1 can be laminated to configure a multilayered stickable-curable adhesive layer 1.

A plurality of the curing agent layers 3 can be laminated to configure a multilayered curing agent layer 3.

EXAMPLES

In the following, the present invention is described in more detail with reference to Examples and Comparative Examples. However, the present invention is not limited to Examples and Comparative Examples by any means. The specific numerical values in blending ratio (content), physical property value, and parameter used in the following description can be replaced with upper limit values (numerical values defined with "or less" or "below") or lower limit values (numerical values defined with "or more" or "above") of corresponding numerical values in blending ratio (content ratio), physical property value, and parameter described in the above-described "DESCRIPTION OF EMBODIMENTS".

In the following description, "part(s)" and "%" are by mass, unless otherwise noted.

1. Production of Stickable-Curable Adhesive Layer and Preparation of Curing Agent Component Preparation Example 1

70 parts of liquid bisphenol A epoxy resin (trade name "jER 828", manufactured by Mitsubishi Chemical Corporation.) and 30 parts of solid bisphenol A epoxy resin (trade name "jER 1256", manufactured by Mitsubishi Chemical Corporation.) were mixed, and methyl ethyl ketone was added to dilute the mixture so that the concentration (liquid bisphenol A epoxy resin and solid bisphenol A epoxy resin concentration) was 60%, thereby preparing varnish. The varnish was applied on the surface of the polyethylene terephthalate film (trade name "Diafoil MRF#38", manufactured by Mitsubishi Plastics, Inc.) treated for release so that its thickness after drying was 20 μm, and it was heated at 100° C. for 1 minute, thereby producing a stickable-curable adhesive layer. Thereafter, the stickable-curable adhesive layer was allowed to contact another polyethylene terephthalate film so that the stickable-curable adhesive layer was sandwiched by two polyethylene terephthalate films.

Separately, a curing agent component was prepared in accordance with the details shown in Table 1.

Preparation Examples 2 to 8 and Comparative Preparation Examples 3 and 4

The stickable-curable adhesive layer and the curing agent layer were prepared in the same manner as in Example 1, except that the blending formulation was changed in accordance with Table 1.

Comparative Preparation Example 1

For the stickable-curable adhesive composition and the curing agent component, a two-component epoxy adhesive was prepared.

Comparative Preparation Example 2

For the stickable-curable adhesive layer, an adhesive tape was prepared.

2. Evaluation

1) Sheet Moldability

The stickable-curable adhesive layer of Preparation Examples 1 to 8 and Comparative Preparation Examples 1 to 4 was evaluated with the following criteria. Those molded into a sheet were evaluated as GOOD, and those could not be molded into a sheet were evaluated as BAD.

The results are shown in Table 1.

2) Peel Adhesion

The stickable-curable adhesive layer was allowed to stand at room temperature for one day.

Thereafter, one side of the polyethylene terephthalate film on the stickable-curable adhesive layer was released, and a polyethylene terephthalate film (trade name "Lumirror 25S10", manufactured by PANAC Corporation) having a thickness of 25 μm was disposed on the exposed stickable-curable adhesive layer. Then, it was cut to a width of 20 mm, the other polyethylene terephthalate film was released, and the exposed stickable-curable adhesive layer was disposed on an aluminum plate having a thickness of 2 mm. After bonding, a 2-kg roller was applied one round (back and forth) to compression bond. After 30 minutes from the bonding, peel adhesion was measured using a tensile and compression testing machine (device name "TG-1kN", manufactured by Minebea Co., Ltd.) at a peeling angle of 90° and a peeling speed of 300 mm/min.

In Comparative Preparation Example 1, the stickable-curable adhesive layer, which was prepared using component A of the two-component epoxy adhesive, was subjected to the above-described peeling test.

In Comparative Preparation Example 2, an adhesive tape was used and subjected to the above-described peeling test.

The results are shown in Table 1.

3) Constant Load Test

The stickable-curable adhesive layer of Preparation Examples 1 to 8 and Comparative Preparation Examples 3 and 4 was allowed to stand at room temperature for one day.

Thereafter, one polyethylene terephthalate film of the stickable-curable adhesive layer was peeled off, and another polyethylene terephthalate film (trade name "Lumirror 25S10", manufactured by PANAC) having a thickness of 25 μm was disposed on the exposed stickable-curable adhesive layer. Then, it was cut into a size of a width of 20 mm×a length of 50 mm, and the other polyethylene terephthalate film (trade name "Diafoil MRF#38", manufactured by Mitsubishi Plastics, Inc.) was peeled off, and the exposed stickable-curable adhesive layer was disposed on a concrete plate (nonflammable board (Mitsubishi flexible board N, thickness 5 mm)). Thereafter, it was compression bonded with a 2-kg hand roller. After compression bonding, a constant load (12 g) was fixed to an end portion of the polyethylene terephthalate film. Peeling of the polyethylene terephthalate film was started with a constant load at normal temperature (25° C.) so that the peeling angle was 90°. With a grip portion of a length of 20 mm, the time until the remaining length 30 mm was all peeled off (maximum 24 hours) was measured.

In Comparative Preparation Example 1, the stickable-curable adhesive layer prepared by using liquid A of the two-component epoxy adhesive was subjected to the above-described constant load test.

In Comparative Preparation Example 2, an adhesive tape was used, and was subjected to the above-described constant load test.

The results are shown in Table 1.

4) Lap-Shear Adhesion

Example 1

The stickable-curable adhesive layer of Preparation Example 1 was allowed to stand at room temperature for one day.

Two stickable-curable adhesive layers were placed on top of the other to form a two layered stickable-curable adhesive layer having a thickness of 40 μm. The stickable-curable adhesive layer was cut into a size of width 30 mm×length 10 mm, and thereafter, one polyethylene terephthalate film was peeled off, and a distal end of a slate plate (JIS A 5430) having a width of 30 mm×length of 130 mm×a thickness of 3 mm was disposed on the exposed stickable-curable adhesive layer. Then, the other polyethylene terephthalate film was peeled off.

Separately, a curing agent component was applied on the distal end (width 30 mm×length 10 mm) of the other slate plate, and then excess liquid on the surface was wiped off, thereby forming a curing agent layer on the surface of the other slate plate. Thereafter, the two slate plates were bonded together so that the stickable-curable adhesive layer and the curing agent layer make contact with each other, and then two slate plates were fixed with a clip, and it was allowed to stand for 24 hours. Thereafter, two slate plates were pulled with a tensile and compression testing machine (device name "TG-5 kN", manufactured by Minebea Co., Ltd.) in a shear direction (length direction) at a peeling speed of 5 mm/min, and testing strength at which one of the two slate plates was peeled off was measured. The lap-shear adhesion was calculated based on the following formula.

Lap-shear adhesion (MPa)=testing strength (N)/300 mm$^2$    (1)

The results are shown in Table 1.

Examples 2 to 8

Lap-shear adhesion was measured in the same manner as in Example 1, except that the stickable-curable adhesive layer and the curing agent layer were changed in accordance with Table 1.

The results are shown in Table 1.

Comparative Example 1

Two components were mixed in accordance with the usage method of the adhesive, and the mixture was applied on a distal end of one slate plate so that its width was 30 mm and length was 10 mm, and the distal end of the one slate plate was bonded to the distal end of the other slate plate, and it was fixed with a clip, and allowed to stand for 24 hours.

The results are shown in Table 1.

Comparative Example 2

A double-sided tape was cut into a size of a width of 30 mm and a length of 10 mm, and bonded to a distal end of one slate plate. The distal end of the slate plate was bonded to a distal end of the other slate plate, and it was fixed with a clip, and allowed to stand for 24 hours.

The results are shown in Table 1.

Comparative Example 3

Lap-shear adhesion was measured in the same manner as in Example 1, except that the stickable-curable adhesive layers were placed on top of the other to form a stickable-curable adhesive layer having a thickness of 40 μm.

The results are shown in Table 1.

Comparative Example 4

Lap-shear adhesion was measured in the same manner as in Example 1, except that instead of allowing the two slate plates fixed with the clip to stand for 24 hours, it was heated at 150° C. for 20 minutes.

The results are shown in Table 1.

TABLE 1

| | Blending formulation of stickable-curable adhesive composition | | | | | | | Blending formulation of curing components | | | |
|---|---|---|---|---|---|---|---|---|---|---|---|
| | Epoxy resin | | Acrylic polymer Acrylic polymer | Curing agent | Cross-linking agent | Concentration in MEK dilution[%] | Heating (drying) conditions | Curing agent | | | |
| | jER828 | jER1256 | | IBMI12 | CORONATE L | | | IBMI12 | BMI12 | EMI24 | ST12 |
| Prep. Ex. 1 | 70 | 30 | — | — | — | 60 | 100° C. 1 min. | 100 | — | — | — |
| Prep. Ex. 2 | 70 | 30 | — | — | — | 60 | 100° C. 1 min. | — | 100 | — | — |
| Prep. Ex. 3 | 70 | 30 | — | — | — | 60 | 100° C. 1 min. | — | — | 80 | — |
| Prep. Ex. 4 | 70 | 30 | — | — | — | 60 | 100° C. 1 min. | 50 | — | — | — |
| Prep. Ex. 5 | 70 | 30 | — | — | — | 60 | 100° C. 1 min. | 20 | — | — | — |
| Prep. Ex. 6 | 70 | 30 | — | — | — | 60 | 100° C. 1 min. | — | — | — | 100 |
| Prep. Ex. 7 | 70 | 30 | — | 0.1 | — | 60 | 150° C. 20 min. | 100 | — | — | — |
| Prep. Ex. 8 | 21 | 9 | 70 | — | 7 | 35 | 120° C. 3 min. →40° C. 3 days | 100 | — | — | — |
| Comp Prep. Ex. 1 | Component A of two-component epoxy adhesive | | | | | | | Component B of two-component epoxy adhesive | | | |
| Comp Prep. Ex. 2 | Pressure-sensitive adhesive tape | | | | | | | — | | | |
| Comp Prep. Ex. 3 | 70 | 30 | — | — | — | 60 | 100° C. 1 min. | No curing agent layer | | | |
| Comp Prep. Ex. 4 | 70 | 30 | — | 3 | — | 60 | 100° C. 1 min. | | | | |

TABLE 1-continued

| | Blending formulation of curing components | | | Pressure-sensitive adhesion | | Stickable-curable adhesive layer and curing agent layer | | Adhesion |
|---|---|---|---|---|---|---|---|---|
| | Epoxy resin jER828 | Solvent MEK | Sheet moldability | Peel adhesion [N/20 mm] | Constant load test [time] | | Curing conditions | Lap-shear adhesion [MPa] |
| Prep. Ex. 1 | — | — | GOOD | 3.7 | 4 | Ex. 1 | Normal Temp | 3.86 |
| Prep. Ex. 2 | — | — | GOOD | 3.7 | 4 | Ex. 2 | Normal Temp | 3.49* |
| Prep. Ex. 3 | — | 20 | GOOD | 3.7 | 4 | Ex. 3 | Normal Temp | 0.66 |
| Prep. Ex. 4 | 50 | — | GOOD | 3.7 | 4 | Ex. 4 | Normal Temp | 2.48 |
| Prep. Ex. 5 | — | 80 | GOOD | 3.7 | 4 | Ex. 5 | Normal Temp | 4.09* |
| Prep. Ex. 6 | — | — | GOOD | 3.7 | 4 | Ex. 6 | Normal Temp | 0.57 |
| Prep. Ex. 7 | — | — | GOOD | 2.2 | No peeling | Ex. 7 | Normal Temp | 2.28 |
| Prep. Ex. 8 | — | — | GOOD | 2.5 | No peeling | Ex. 8 | Normal Temp | 0.34 |
| Comp Prep. Ex. 1 | Component B of two-component epoxy adhesive | | BAD | Unable to measure | Unable to measure | Comp. Ex. 1 | Normal Temp | 3.80 |
| Comp Prep. Ex. 2 | — | | GOOD | 10 | No peeling | Comp. Ex. 2 | No curing | 0.71 |
| Comp Prep. Ex. 3 | No curing agent layer | | GOOD | 3.7 | 4 | Comp. Ex. 3 | No curing | 0.04 |
| Comp Prep. Ex. 4 | | | GOOD | Unable to measure | Unable to measure | Comp. Ex. 4 | Heating | Unable to measure |

*Material failure

In Table 1, the values in the blending formulation column are by parts by mass.

Abbreviations used in Table 1 are described below.

jER 828: bisphenol A epoxy resin, normal temperature (25° C.) liquid, viscosity (25° C.) 120 Pa·s to 150 Pa·s, manufactured by Mitsubishi Chemical Corporation.

jER 1256: high molecular weight bisphenol A epoxy resin, normal temperature (25° C.) solid, softening point 85° C., manufactured by Mitsubishi Chemical Corporation.

Acrylic Polymer:

The acrylic polymer was prepared by the following procedures.

A four-neck flask equipped with a stirring blade, a thermometer, a nitrogen gas inlet tube, and a condenser was charged with 100 parts of n-butylacrylate, 0.1 parts of 2-hydroxyethylacrylate, 3 parts of acrylic acid, 0.1 parts of 2,2'-azobisisobutyronitrile as a polymerization initiator, 100 parts of ethyl acetate, and 100 parts of toluene, and nitrogen gas was introduced while gently stirring the mixture, thereby conducting nitrogen replacement for 1 hour. Thereafter, polymerization reaction was performed for 15 hours while keeping the liquid temperature in the flask at around 55° C., thereby preparing an acrylic polymer solution having a weight-average molecular weight of 60 million.

CORONATE L: isocyanate cross-linking agent

IBMI 12: 1-isobutyl-2-methyl imidazole, normal temperature liquid, manufactured by Mitsubishi Chemical Corporation.

BMI 12: 1-benzyl-2-methyl imidazole, normal temperature liquid, manufactured by Mitsubishi Chemical Corporation.

EMI 24: 2-ethyl-4-methyl imidazole, normal temperature solid, manufactured by Mitsubishi Chemical Corporation.

ST12: amine curing agent, manufactured by Mitsubishi Chemical Corporation.

MEK: methyl ethyl ketone

Two-component epoxy adhesive: trade name "High Super 5", manufactured by CEMEDINE Co., ltd.

Adhesive tape: trade name "No. 5000NS", manufactured by Nitto Denko Corporation

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The adhesion method of the present invention is used for production of an adhesion-structure.

DESCRIPTION OF REFERENCE NUMERALS 1 stickable-curable adhesive layer
2 first adherend
3 curing agent layer
4 second adherend
5 cured layer
6 adhesion-structure
7 adhesion kit

The invention claimed is:

1. An adhesion method including:
disposing a curable adhesive layer on a first adherend, wherein the curable adhesive layer has a pressure-sensitive adhesiveness;
disposing a curing agent layer on a second adherend, wherein the curing agent layer is formed by applying a varnish of a curing agent component consisting of a curing agent directly to the second adherend, and the curing agent layer is able to cure the curable adhesive layer by contacting and reacting with the curable adhesive layer; and
bringing the curable adhesive layer into contact with the curing agent layer so that the curable adhesive layer and the curing agent layer are sandwiched by the first adherend and the second adherend.

2. The adhesion method according to claim 1, wherein the curable adhesive layer has a peel adhesion of 1.0N/20 mm or more, when the curable adhesive layer is bonded to an aluminum plate and peeled off from the aluminum plate at 90 degrees and a speed of 300 mm/min.

3. The adhesion method according to claim 1, wherein a cured layer formed by a reaction between the curable adhesive layer and the curing agent layer has a lap-shear adhesion of 1.0 MPa or more, and the lap-shear adhesion is measured by the following test:

sandwiching the curable adhesive layer with two polyethylene terephthalate films that were subjected to release treatment, and leaving the curable adhesive layer and the polyethylene terephthalate films at room temperature for one day, peeling one of the polyethylene terephthalate films off from the curable adhesive layer and disposing the peeled curable adhesive layer on a first slate plate, peeling the other of the polyethylene terephthalate film off from the curable adhesive layer, disposing the curing agent layer on a second slate plate, bringing the curable adhesive layer and the curing agent layer into contact with each other so that the curable adhesive layer and the curing agent layer are sandwiched by the first slate plate and the second slate plate, and allowing to stand for 24 hours to form a cured layer, and pulling the first slate plate and the second slate plate in a shear direction at a speed of 5 mm/min, wherein the lap-shear adhesion is defined as a strength at a time when the two slate plates are peeled off.

4. The adhesion method according to claim 1, wherein the curable adhesive layer contains epoxy resin as main component.

5. The adhesion method according to claim 1, wherein bringing the curable adhesive layer into contact with the curing agent layer comprises curing the curable adhesive layer at 25° C.

6. An adhesion method including:

disposing a curable adhesive layer on a first adherend, wherein the curable adhesive layer has a pressure-sensitive adhesiveness;

disposing a curing agent layer on a surface of the curable adhesive layer, wherein the curing agent layer is formed by applying a varnish of a curing agent component consisting of a curing agent directly to the curable adhesive layer; and bringing a second adherend into contact with the curing agent layer so that the curable adhesive layer and the curing agent layer are sandwiched by the first adherend and the second adherend.

* * * * *